Oct. 30, 1934.　　　S. H. FULLER　　　1,978,995

ANIMAL TRAP

Filed Oct. 6, 1933　　2 Sheets-Sheet 1

S. H. Fuller Inventor

Oct. 30, 1934.   S. H. FULLER   1,978,995
ANIMAL TRAP
Filed Oct. 6, 1933   2 Sheets-Sheet 2
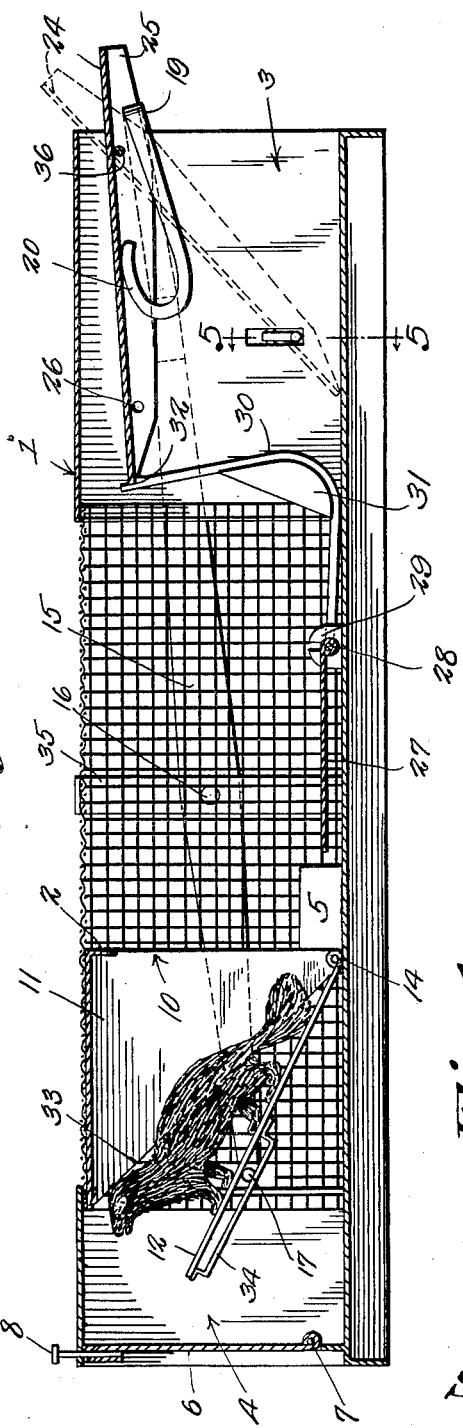
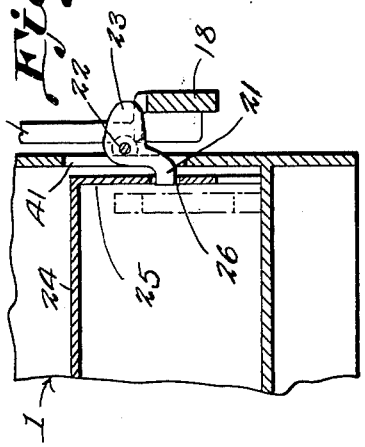
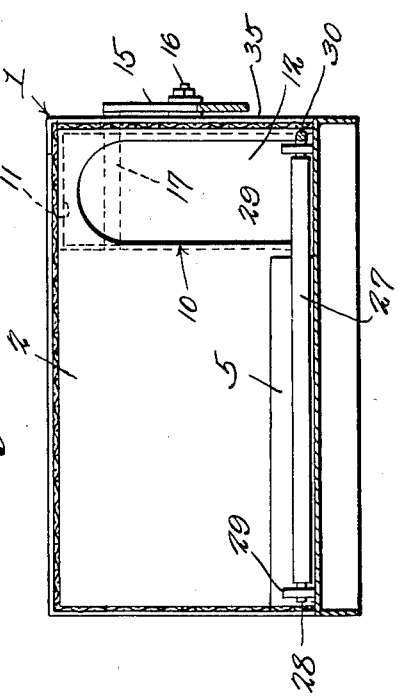
S.H.Fuller Inventor
By C.A.Snow & Co.
Attorneys.

Patented Oct. 30, 1934

1,978,995

UNITED STATES PATENT OFFICE 1,978,995

ANIMAL TRAP

Samuel H. Fuller, Atlanta, Ga.

Application October 6, 1933, Serial No. 692,511

2 Claims. (Cl. 43—76)

This invention aims to provide a trap in which an animal may imprison himself in a front compartment, pass to a rear compartment and reset the trap so that another animal may enter the front compartment, and imprison himself in the other or rear compartment, from which he may be removed for destruction.

A preferred form is shown, but a person working within the scope of the claims can make changes in that form, without departing from the spirit of the invention.

Fig. 3 is a section on the line 3—3 of Fig. 2;

Fig. 4 is a section on the line 4—4 of Fig. 1;

Fig. 5 is a section on the line 5—5 of Fig. 3.

Figure 1:
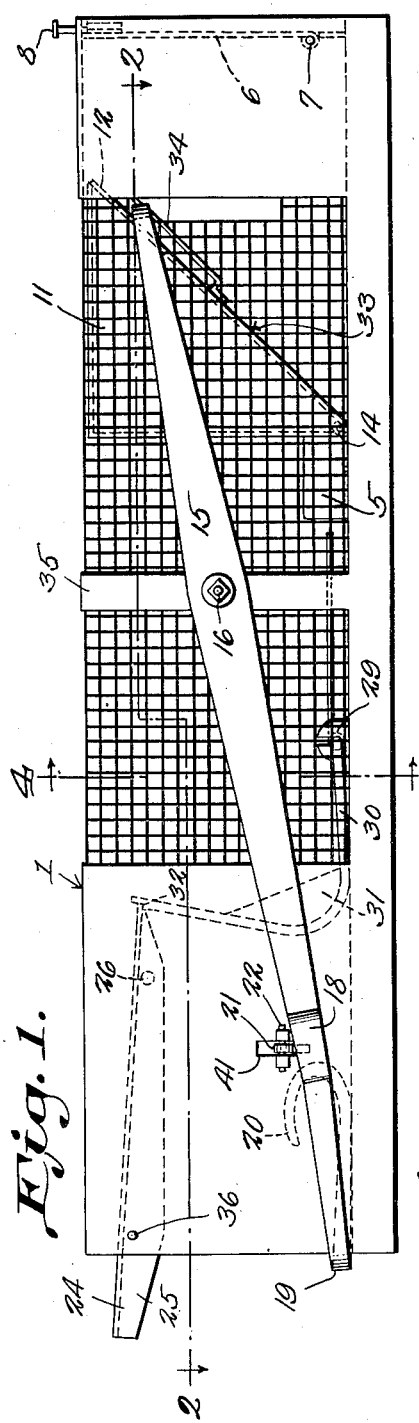
Fig. 1 is a side elevation.
Figure 2:
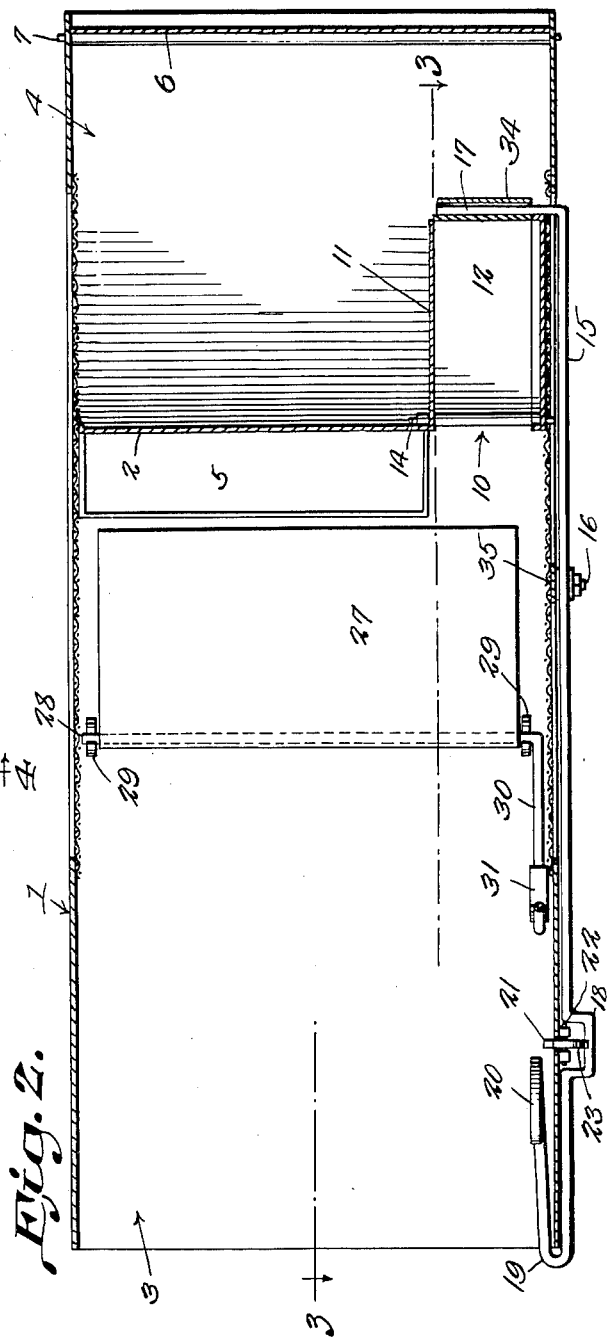
Fig. 2 is a section on the line 2—2 of Fig. 1.

The trap includes a casing 1, made of metal sheeting and wire netting, and provided with a transverse partition 2 forming a front compartment 3 and a rear compartment 4. A bait receptacle 5 extends rearwardly from the partition 2 into the front compartment 3. The rear compartment 4 is closed at its outer end by a gate 6, pivotally mounted at 7, near to its lower edge, and held closed by a latch pin 8 in the top of the casing 1.

The partition 2 has a doorway 10, leading from the front compartment 3 to the rear compartment 4. An arched guideway 11 is secured to the partition 2, about the doorway 10 and extends into the rear compartment 4. The guideway 11 has an inclined lower edge 33, with which cooperates a closure and runway 12, hingedly mounted at 14, on the casing 1, at the inner end of the runway. Near to its free end, the closure and runway 12 has a longitudinal loop-shaped guide 34.

A lever 15 is located on the outside of the casing 1 and extends longitudinally of the trap. The forward end of the lever 15 is heavier than the rear end thereof, so that the lever tends to gravitate to the position shown in Fig. 1. The lever 15 is fulcrumed at 16 on a vertical strip 35 forming part of the casing 1 of the trap. At its rear end, the lever 15 has an inwardly extended rectangular arm 17, engaged underneath the closure and runway 12 and received in the guide 34 on the part 12. The forward portion of the lever 15 has an offset 18. The lever 15 is provided with a curved portion 19, extended around one side wall of the casing 1, into the front compartment 3, and curved to form an overhanging finger 20.

A transverse latch 21 works in a slot 41 in the side wall of the casing 1 and is pivotally mounted at 22 on the said side wall, for vertical swinging movement. The offset 18 of the lever 15 is adapted to engage the outer end of the latch 21. The latch 21 is weighted at 23 so that the inner end of the latch tends to swing inwardly.

A forward door 24 for the compartment 3 is provided, and has depending flanges 25. One of the flanges 25 has an opening or keeper 26, adapted to be engaged by the inner end of the latch 21. The door 24 is pivotally mounted at 36, in the side walls of the trap casing 1, near to the top of the casing and near to the upper edge of the door, the construction being such that the door tends to swing from the open, solid line position of Fig. 3 to the closed dotted line position of that figure. The finger 20 of the lever 15 is adapted to cooperate with the under or outer surface of the door 24.

A tread plate 27 is located in the front compartment 3, between the door 24 and the partition 2. The tread plate 27 is pivotally mounted for vertical swinging movement by means of a shaft 28 secured to one end of the tread plate and journaled removably in bearings 29 mounted on the bottom of the casing 1. To one corner of the tread plate 27, an angular, upwardly extended trigger 30 is secured, and this trigger may be a continuation of the shaft 28. A weight 31 is secured in the angle of the trigger 30, and overcomes the weight of the tread plate 27. On the upper end of the trigger 30 there is a shoulder 32, on which the inner edge of the door 24 is adapted to rest.

To set the trap, the door 24 is swung upwardly to the solid line position of Fig. 3, until its inner edge is engaged with the shoulder 32 on the trigger 30 of the tread plate 27. The lever 15, being heaviest at its forward end, assumes the position of Fig. 1, the rear end of the lever being raised, and the arm 17 of the lever holding the closure 12 in closed position, so that an animal which is already trapped, and is in the rear compartment 4, cannot make his escape through the door 10 into the compartment 3, and out of the open end of the compartment. The latch 21, being weighted at 22, at its outer end, hangs in such a position that its inner end is in the path of the flange 25 of the door 24 which has the opening or keeper 26.

The screen part of the trap admits light to the bait in the bait receptacle 5, and the animal can see the bait from the forward end of the trap. The animal, attracted by the bait, enters the forward end of the trap, passes into the front compartment 3 and steps on the tread plate 27. The tread plate 27 is depressed, and swings on its pivotal mounting 28, the shoulder 32 on the trigger 30 of the tread plate being disengaged from the inner edge of the door 24, the door swinging to a closed position on its pivotal mounting 36, the lever 15 at this time being in the position of Fig. 1. As the door 24 swings to a closed position, the flange 25 of the door which has the keeper opening 26 engages the inner end of the latch 21 and swings that end of the latch outwardly. When the door 24 is in closed position, the weight 23 on the outer end of the latch 21 causes the inner end of the latch to engage in the keeper opening 26 in the flange of the door 24. The door 24 thus is locked in closed position.

The animal now is imprisoned in the compartment 3, between the closed door 24 and the partition 2. In attempting to escape, the animal passes through the door 10 in the partition 2 and depresses the closure and runway 12 on its hinge mounting 14. The animal passes into the rear compartment 4.

As the animal depresses the runway 12, the runway engages the arm 17 on the lever 15 and raises the forward portion of the lever 15. The first result is that the offset 18 of the lever 15 engages the outer end of the latch 21 and disengages the inner end of the latch from the keeper opening 26 of the door 24, which is in a closed position at this time. The second result of the raising of the forward end of the lever 15 is that the finger 20 of the lever, engaging the door 24, raises the door to the solid line position of Fig. 3, whereupon the inner edge of the door 24 automatically engages with the shoulder 32 on the trigger 30 of the tread plate 27, the door 24 being thus held releasably in the open position of Fig. 3, ready to receive another animal. When the animal on the closure 12, as shown in Fig. 3, steps off the member 12, into the rear compartment 4, the lever 15 reassumes the position of Fig. 1, because the forward end of the lever is heavier, and as the finger 17 on the lever 15 is raised, it closes the member 12, thereby trapping the animal in the rear compartment 4. The animal trapped in the compartment 4 can be destroyed therein, by drowning or otherwise, or if the operator prefers, he can open the gate 6 and let the animal out into a bag or other receptacle.

I claim:

1. A trap comprising a casing having a side wall and provided with a partition dividing the casing into front and rear compartments, the partition having a doorway leading from the front compartment to the rear compartment, a vertically swinging closure and runway hinged to the casing and controlling the doorway, the closure and runway being located in the rear compartment, a door controlling the inlet end of the front compartment, the door being located in the front compartment, pivot means connecting the door with the casing for vertical swinging movement, a tread member pivotally mounted for vertical swinging movement in the front compartment and having a part for engaging the inner portion of the door to hold the door open, a lever fulcrumed intermediate its ends on the casing, and means for connecting one end of the lever operatively with the closure, the opposite end of the lever extending around the forward edge of said side wall and backwardly into the front compartment for engagement with the door at a place to the rear of the pivot means, thereby to open the door and engage it with said part of the tread member, when the lever is operated by the closure and runway.

2. A trap comprising a casing having a side wall and provided with a partition dividing the casing into front and rear compartments, the partition having a doorway leading from the front compartment to the rear compartment, a vertically swinging closure and runway hinged to the casing and controlling the doorway, the casing and runway being located in the rear compartment, a door controlling the inlet end of the front compartment, the door being located in the front compartment, pivot means connecting the door with the casing for vertical swinging movement, a tread member pivotally mounted for vertical swinging movement in the front compartment and having a part for engaging the inner portion of the door to hold the door open, a lever fulcrumed intermediate its ends on the casing, means for connecting one end of the lever operatively with the closure, the opposite end of the lever engaging the door at a place to the rear of the pivot means, thereby to open the door and engage it with said part of the tread member, when the lever is operated by the closure and runway, and a latch disposed transversely of the lever and fulcrumed intermediate its ends on said side wall, the outer end of the latch being weighted to cause its inner end to engage the door and hold the door closed, the lever engaging the outer end of the latch, to disengage the inner end of the latch from the door, when said opposite end of the lever moves upwardly to open the door.

SAMUEL H. FULLER.